No. 790,031. PATENTED MAY 16, 1905.
E. Z. CROWELL & M. GULICK.
ADJUSTABLE CRANK.
APPLICATION FILED SEPT. 3, 1904.

Witnesses
W. N. Woodson
G. L. Natt

Inventors
Elvaro Z. Crowell
Morgan Gulick

By R. H. & A. B. Lacey, Attorneys

No. 790,031. Patented May 16, 1905.

UNITED STATES PATENT OFFICE.

ELVARO Z. CROWELL AND MORGAN GULICK, OF MOUNTVERNON, MICHIGAN.

ADJUSTABLE CRANK.

SPECIFICATION forming part of Letters Patent No. 790,031, dated May 16, 1905.

Application filed September 3, 1904. Serial No. 223,277.

*To all whom it may concern:*

Be it known that we, ELVARO Z. CROWELL and MORGAN GULICK, citizens of the United States, residing at Mountvernon, in the county of Macomb and State of Michigan, have invented certain new and useful Improvements in Adjustable Cranks, of which the following is a specification.

This invention relates to improvements in fishing-line reels, and provides a novel form of crank for rotating the reel, said crank being adjustable, so that in operating the rod to throw the line the crank will be balanced on the reel to facilitate such operation and in winding the line further adjustment of the crank will increase the throw thereof, and thereby increase the power or leverage, this being very advantageous, as it enables the operator to draw in the line in catching large fish with greater ease than is incident in the use of the ordinary forms of reel devices.

For a full description of the invention and the merits thereof and also to acquire a knowledge of the details of construction of the means for effecting the result reference is to be had to the following description and accompanying drawings.

While the essential and characteristic features of the invention are susceptible of modification, still the preferred embodiment of the invention is illustrated in the accompanying drawings, in which—

Figure 1:
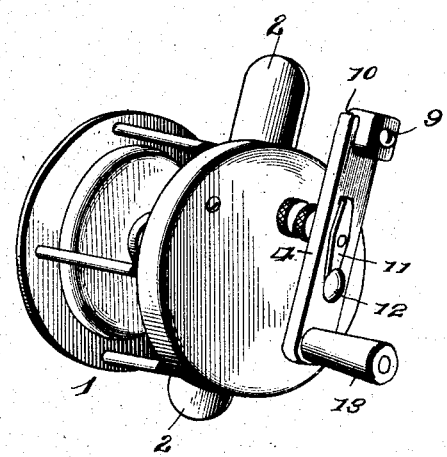
Figure 2:
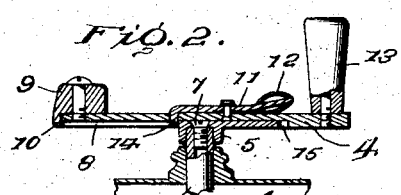
Figure 3:
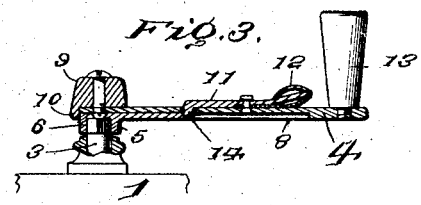
Figure 4:
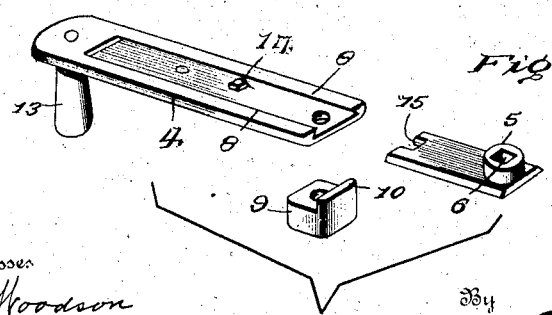

Figure 1 is a perspective view of a fishing-line reel embodying the invention. Fig. 2 is a vertical sectional view through the crank of the reel and the adjacent attaching parts, said crank being shown in balanced position upon the shaft directly operated thereby. Fig. 3 is a view similar to Fig. 2, the crank being shown in the position in which it is used in winding the line upon the reel. Fig. 4 is a detail perspective view showing the crank and the weight or stop member carried thereby spaced from each other.

Corresponding and like parts are referred to in the following description and indicated in all the views of the drawings by the same reference characters.

The reel 1 shown in the drawings is of the type commonly employed for fishing-rods, having the plate 2, by which it may be readily clamped to the butt of the rod. The reel 1 is operated by means of a short shaft 3 having a pinion meshing with a small gear upon the reel-shaft, the part 3 being suitably mounted at one side of the frame of the reel in the ordinary manner. The short shaft 3, which operates the reel 1, carries the crank 4, the special construction of which constitutes the essential feature of the invention. The crank 4 is adjustable upon the end of the shaft 3, being adapted for slidable movement, so as to be disposed in balanced position upon said shaft or extended therefrom to increase the throw of said crank, as before mentioned. The short shaft 3 has mounted upon its outer end a head 5, consisting of a plate provided at one end with a square opening 6 to receive the squared outer end of the shaft 3. The head 5 is attached to the shaft 3 by means of a screw 7 or like fastening device, and the head of this screw is countersunk, as shown most clearly in Figs. 2 and 3 of the drawings. The crank 4 is slidable longitudinally of the head 5 and is provided upon its under side with spaced guide-flanges 8, which are undercut to receive the beveled edges of the plate which comprises the head 5. The flanges 8 of the crank form guides which direct the slidable movement of the crank upon the part 5 and prevent displacement of the member 4 in a manner readily apparent. In order to limit the movement of the crank 4 upon the head 5, the weight 9, which is ordinarily used upon the cranks of fishing-line reels as a counterbalance for the handle, is made removable, and said weight 9 has projected from its under side a lip or lug 10, which extends into the path of movement of the head as the crank is slid thereon, so as to prevent the head from passing from between the guide-flanges 8, which would displace the crank in a manner clearly apparent. The weight 9 is preferably attached to the crank 4 by means of a set-screw or the like.

When the crank 4 is moved so as to dispose the head 5 of the shaft 3 about centrally of the ends thereof, said crank is in balanced position upon the shaft, and such position admits of throwing the line by the usual operation of the rod as commonly practiced by fishermen. When it is desired to wind the line upon the reel, the crank 4 is moved longitudinally of the head 5 until said head engages the weight or stop member 9, and the throw of the crank is thus increased—in this instance about twofold—which is advantageous in that the line may be wound upon the reel with increased power. To hold the crank fixed at the adjustments above described, a latch-plate 11 is secured to the upper side of the crank 4 at a point between its ends, one end of said latch-plate being provided with a finger-piece 12, located adjacent the handle 13, by which the crank is operated, the opposite end of the latch-plate being provided with an engaging member 14, which passes through an opening in the crank. The member 14 is a lug formed by a bent end of the plate 11, and this lug is adapted to engage either end of the head 5, so as to positively hold the crank in balanced or extended position at the will of the operator. One end of the plate which comprises the head 5 may be provided with a notch 15, into which the lug 14 of the latch-plate enters when the latter is in coöperative relation with the said head. The finger-piece 12 of the latch-plate 11 being located conveniently as regards the handle 13 can be operated readily by the finger of the fisherman as he grasps the handle preparatory to winding the line upon the reel.

It will be understood that the extensible construction of the wheel-crank is applicable for other purposes than that set forth above, though it is especially adapted for reels and similar devices.

Having thus described the invention, what is claimed as new is—

1. In combination, a shaft, a head upon an end of said shaft, a crank slidably mounted upon said head, a latch device secured to said crank between its ends and provided at one end with an engaging member coöperating with the head, and a finger-piece at the opposite end.

2. In combination, a shaft, a head at an end of the shaft, a crank, there being spaced guides projected from the under side of said crank and receiving the head, a latch device attached to the upper side of the crank at a point between its ends and provided at one end with an engaging member coöperating with the head to fix the position of the crank, and a finger-piece at the other end of said latch device.

3. In combination, a shaft, a head at an end of the shaft and comprising a plate provided with an opening receiving the shaft, said plate being notched at one end, a crank slidably mounted upon the head and provided upon its under side with spaced guide-flanges receiving said head, a latch attached upon the upper side of the crank at a point between its ends, a lug projected from one end of said latch and extending through the crank and adapted to engage in the notch in the head, and a finger-piece carried by the opposite end of the latch.

4. In combination, a shaft, a head mounted upon an end of the shaft and comprising a plate having its longitudinal edges beveled, a crank mounted upon the head aforesaid and provided upon its under side with spaced undercut guide-flanges adapted to receive the longitudinal edges of the head, a weight at one end of the crank and provided with a lug projected from the under side thereof, a handle at the end of the crank opposite the weight, a latch device secured to the crank at a point between its ends and provided at one end with a lug extending through the crank and adapted to engage the head, and a finger-piece upon the other end of the latch device adjacent the handle aforesaid.

In testimony whereof we affix our signatures in presence of two witnesses.

ELVARO Z. CROWELL. [L. S.]
MORGAN GULICK. [L. S.]

Witnesses:
JOHN H. COOK,
LARENA J. BONNEY.